USOO6154812A

United States Patent [19]
Hetherington et al.

[11] Patent Number: 6,154,812
[45] Date of Patent: Nov. 28, 2000

[54] METHOD FOR INHIBITING THRASHING IN A MULTI-LEVEL NON-BLOCKING CACHE SYSTEM

[75] Inventors: Ricky C. Hetherington, Pleasanton; Sharad Mehrotra, Cupertino; Ramesh Panwar, Santa Clara, all of Calif.

[73] Assignee: Sun Microsystems, Inc., Palo Alto, Calif.

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/881,725

[22] Filed: Jun. 25, 1997

[51] Int. Cl.[7] ....................................... G06F 12/08
[52] U.S. Cl. ...................... 711/122; 711/140; 711/167
[58] Field of Search ..................................... 711/118, 122, 711/140, 141, 167, 169

[56] References Cited

U.S. PATENT DOCUMENTS

| 5,555,392 | 9/1996 | Chaput et al. ......................... 711/118 |
| 5,621,896 | 4/1997 | Burgess et al. ........................ 711/118 |
| 5,623,628 | 4/1997 | Brayton et al. ........................ 711/141 |
| 5,671,444 | 9/1997 | Akkary et al. ......................... 395/872 |
| 5,715,428 | 2/1998 | Wang et al. ............................ 711/141 |
| 5,787,469 | 7/1998 | Merrell .................................. 711/122 |
| 5,809,530 | 9/1998 | Samra et al. ........................... 711/140 |
| 5,867,725 | 2/1999 | Fung et al. .............................. 712/23 |

OTHER PUBLICATIONS

Smith, Alan Jay; "Cache Memories," *Computing Surveys*, vol. 14, No. 3, Sep. 1982, pp. 473–530.
Jim Handy, "The Cache Memory Book", pp. 40–46, 1993.
Dileep Bhandarkar and Jason Ding, "Performance Characterization of the Pentium Pro Processor", IEEE, pp. 288–297, http://iel.ihs.com/, 1997.

*Primary Examiner*—Do Hyun Yoo
*Assistant Examiner*—Gary J. Portka
*Attorney, Agent, or Firm*—Gunnison, McKay & Hodgson, LLP; Philip McKay

[57] ABSTRACT

A data cache unit associated with a processor, the data cache unit including a first non-blocking cache receiving a data access from a device in the processor. A second non-blocking cache is coupled to the first non-blocking cache to service misses in the first non-blocking cache. A data return path coupled to the second non-blocking cache couples data returning from the second non-blocking cache to both the first non-blocking cache and the device generating the access to the first non-blocking cache.

12 Claims, 7 Drawing Sheets

METHOD FOR INHIBITING THRASHING IN A MULTI-LEVEL NON-BLOCKING CACHE SYSTEM

CROSS-REFERENCES TO RELATED APPLICATIONS

The subject matter of the present application is related to that of co-pending U.S. patent application Ser. No. 08/881,958 identified as Docket No. P2345/37178.830071.000 for AN APPARATUS FOR HANDLING ALIASED FLOATING-POINT REGISTERS IN AN OUT-OF-ORDER PROCESSOR filed concurrently herewith by Ramesh Panwar; Ser. No. 08/881,729 identified as Docket No. P2346/37178.830072.000 for APPARATUS FOR PRECISE ARCHITECTURAL UPDATE IN AN OUT-OF-ORDER PROCESSOR filed concurrently herewith by Ramesh Panwar and Arjun Prabhu; Ser. No. 08/881,726 identified as Docket No. P2348/37178.830073.000 for AN APPARATUS FOR NON-INTRUSIVE CACHE FILLS AND HANDLING OF LOAD MISSES filed concurrently herewith by Ramesh Panwar and Ricky C. Hetherington; Ser. No. 08/881,908 identified as Docket No. P2349/37178.830074.000 for AN APPARATUS FOR HANDLING COMPLEX INSTRUCTIONS IN AN OUT-OF-ORDER PROCESSOR filed concurrently herewith by Ramesh Panwar and Dani Y. Dakhil; Ser. No. 08/882,173 identified as Docket No. P2350/37178.830075.000 for AN APPARATUS FOR ENFORCING TRUE DEPENDENCIES IN AN OUT-OF-ORDER PROCESSOR filed concurrently herewith by Ramesh Panwar and Dani Y. Dakhil; Ser. No. 08/881,145 identified as Docket No. P2351/37178.830076.000 for APPARATUS FOR DYNAMICALLY RECONFIGURING A PROCESSOR filed concurrently herewith by Ramesh Panwar and Ricky C. Hetherington; Ser. No. 08/881,239 identified as Docket No. P2518/37178.830095.000 for A METHOD FOR ENSURING FAIRNESS OF SHARED EXECUTION RESOURCES AMONGST MULTIPLE PROCESSES EXECUTING ON A SINGLE PROCESSOR filed concurrently herewith by Ramesh Panwar and Joseph I. Chamdani; Ser. No. 08/882,175 identified as Docket No. P2355/37178.830078.000 for SYSTEM FOR EFFICIENT IMPLEMENTATION OF MULTI-PORTED LOGIC FIFO STRUCTURES IN A PROCESSOR filed concurrently herewith by Ramesh Panwar; Ser. No. 08/882,311 identified as Docket No. P2365/37178.830080.000 for AN APPARATUS FOR MAINTAINING PROGRAM CORRECTNESS WHILE ALLOWING LOADS TO BE BOOSTED PAST STORES IN AN OUT-OF-ORDER MACHINE filed concurrently herewith by Ramesh Panwar, P. K. Chidambaran and Ricky C. Hetherington; Ser. No. 08/881,731 identified as Docket No. P2369/37178.830081.000 for APPARATUS FOR TRACKING PIPELINE RESOURCES IN A SUPERSCALAR PROCESSOR filed concurrently herewith by Ramesh Panwar; Ser. No. 08/882,525 identified as Docket No. P2370/37178.830082.000 for AN APPARATUS FOR RESTRAINING OVER-EAGER LOAD BOOSTING IN AN OUT-OF-ORDER MACHINE filed concurrently herewith by Ramesh Panwar and Ricky C. Hetherington; Ser. No. 08/882,220 identified as Docket No. P2371/37178.830083.000 for AN APPARATUS FOR HANDLING REGISTER WINDOWS IN AN OUT-OF-ORDER PROCESSOR filed concurrently herewith by Ramesh Panwar and Dani Y. Dakhil; Ser. No. 08/881,847 identified as Docket No. P2372/37178.830084.000 for AN APPARATUS FOR DELIVERING PRECISE TRAPS AND INTERRUPTS IN AN OUT-OF-ORDER PROCESSOR filed concurrently herewith by Ramesh Panwar; Ser. No. 08/881,728 identified as Docket No. E-2398/37178.830085.000 for NON-BLOCKING HIERARCHICAL CACHE THROTTLE filed concurrently herewith by Ricky C. Hetherington and Thomas M. Wicki; Ser. No. 08/881,727 identified as Docket No. P2406/37178.830086.000 for NON-THRASHABLE NON-BLOCKING HIERARCHICAL CACHE filed concurrently herewith by Ricky C. Hetherington, Sharad Mehrotra and Ramesh Panwar; Ser. No. 08/881,065 identified as Docket No. P2408/37178.830087.000 for IN-LINE BANK CONFLICT DETECTION AND RESOLUTION IN A MULTI-PORTED NON-BLOCKING CACHE filed concurrently herewith by Ricky C. Hetherington, Sharad Mehrotra and Ramesh Panwar; and Ser. No. 08/882,613 identified as Docket No. P2434/37178.830088.000 for SYSTEM FOR THERMAL OVERLOAD DETECTION AND PREVENTION FOR AN INTEGRATED CIRCUIT PROCESSOR filed concurrently herewith by Ricky C. Hetherington and Ramesh Panwar, the disclosures of which applications are herein incorporated by this reference.

BACKGROUND OF THE INVENTION

1. Field of the Invention

The present invention relates in general to microprocessors and, more particularly, to a system, method, and microprocessor architecture providing a cache throttle in a non-blocking hierarchical cache.

2. Relevant Background

Modern processors, also called microprocessors, use techniques including pipelining, superpipelining, superscaling, speculative instruction execution, and out-of-order instruction execution to enable multiple instructions to be issued and executed each clock cycle. As used herein the term processor includes complete instruction set computers (CISC), reduced instruction set computers (RISC) and hybrids. The ability of processors to execute instructions has typically outpaced the ability of memory subsystems to supply instructions and data to the processors, however. Most processors use a cache memory system to speed memory access.

Cache memory comprises one or more levels of dedicated high-speed memory holding recently accessed data, designed to speed up subsequent access to the same data. Cache technology is based on a premise that programs frequently re-execute the same instructions. When data is read from main system memory, a copy is also saved in the cache memory, along with an index to the associated main memory. The cache then monitors subsequent requests for data to see if the information needed has already been stored in the cache. If the data had indeed been stored in the cache, the data is delivered immediately to the processor while the attempt to fetch the information from main memory is aborted (or not started). If, on the other hand, the data had not been previously stored in cache then it is fetched directly from main memory and also saved in cache for future access.

Typically, processors support multiple cache levels, most often two or three levels of cache. A level 1 cache (L1 cache) is usually an internal cache built onto the same monolithic integrated circuit (IC) as the processor itself. On-chip cache is the fastest (i.e., lowest latency) because it is accessed by the internal components of the processor. On the other hand, off-chip cache is an external cache of static random access memory (SRAM) chips plugged into a motherboard. Off-chip cache has much higher latency, although is typically much shorter latency than accesses to main memory.

Given the size disparity between main system memory (which may be tens or hundreds of megabytes) and cache memory (which is typically less than one megabyte), certain rules are used to determine how to copy data from main memory to cache as well as how to make room for new data when a cache is full. In direct mapped cache, the cache location for a given memory address is determined from the middle address bits. In other words, each main memory address maps to a unique location in the cache. Hence, a number of different memory addresses will map to the same cache location. In a fully associative cache, data from any main memory address can be stored in any cache location. Each cache line is indexed by a "tag store" that holds a "tag" generated, for example, by hashing the memory address that it indexes. All tags are compared simultaneously (i.e., associatively) with a requested address, and if one tag matches, then its associated data is accessed. This requires an associative memory to hold the tags which makes this form of cache expensive.

Set associative cache is essentially a compromise between direct mapped cache and a fully associative cache. In a set associative cache, each memory address is mapped to a certain set of cache locations. An N-way set associative cache allows each address to map to N cache locations (for example, four-way set associative allows each address to map to four different cache locations). In other words, in a four-way set associative cache, each tag maps to four possible cache locations in a set. Upper address bits in the requested address will uniquely identify which item in the set the tag is referencing.

Modern processors pipeline memory operations to allow a second load operation to enter a load/store stage in an execution pipeline before a first load/store operation has passed completely through the execution pipeline. Typically, a cache memory that loads data to a register or stores data from the register is outside of the execution pipeline. When an instruction or operation is passing through the load/store pipeline stage, the cache memory is accessed. If valid data is in the cache at the correct address a "hit" is generated and the data is loaded into the registers from the cache. When requested data is not in the cache, a "miss" is generated and the data must be fetched from a higher cache level or main memory. The latency (i.e., the time required to return data after a load address is applied to the load/store pipeline) of higher cache levels and main memory is significantly greater than the latency of lower cache levels.

In a pipelines hierarchical cache system that generates multiple cache accesses per clock cycle, coordinating data traffic is problematic. A cache line fill operation, for example, needs to be synchronized with the return data, but the lower level cache executing the line fill operation cannot predict when the required data will be returned. As a result, the cache may "thrash". When a first access to a given cache line results in a miss the access is sent on to be serviced by a higher cache level or main memory. When the first access is filled, the cache line becomes valid. In typical cache structures, after the cache line becomes valid it is forwarded to a lower cache level or device that generated the first access. A thrash occurs when a second access to the same cache line reaches the cache before the valid data is forwarded to a lower cache level. The second access can overwrite the valid first data thereby preventing the first data access from being serviced. In some cases, this results in the first access being repeated, thereby invalidating the original second access. Forward progress is prevented as the first and second accesses overwrite each other. Thrashing is complicated in a set-associative cache design because multiple in flight references can be mapped to the same tag entry.

One method of handling thrashing in prior designs is by using "blocking" cache that prohibits or blocks cache activity until a miss has been serviced by a higher cache level or main memory and the line fill operation completed. In this case, the second access is stalled until the first access is complete, and the second access (to the same cache line) will hit in the cache. However, blocking cache stalls the memory pipeline, slowing memory access and reducing overall processor performance.

On the other hand, where one or more levels are non-blocking, each cache level is unaware of the results of the accesses (i.e., hit or miss) or the resources available at the next higher level of the hierarchy. In a non-blocking cache, a cache miss launches a line fill operation that will eventually be serviced, however, the cache continues to allow load/store request from lower cache levels or functional units in a processor. To prevent thrashing, prior designs include a "transit bit" for each cache entry, usually implemented in the cache tag. The transit bit is set while an access is "in flight" (i.e., after being sent up to a higher cache level or main memory, but before the data has returned to fill and validate the cache line).

Using the transit bit, a second access to the same cache line can detect when a thrash would occur, and either find another tag against which to reference this access (if available) or stall the processor until a tag becomes available. By finding another tag, the effect is to allocate a second cache line to hold the returned data, from the second access to prevent thrashing. When the processor is stalled, memory access is slowed and overall processor performance is reduced.

What is needed is a cache architecture and a method for operating a cache subsystem that tolerates or inhibits thrashing in a hierarchical non-blocking cache and is compatible with high speed processing and memory access.

SUMMARY OF THE INVENTION

The present invention involves a multi-level cache and method for operation of a multi-level cache generating multiple cache system accesses simultaneously. The data cache unit includes a first non-blocking cache receiving a data access from a device in the processor. A second non-blocking cache is coupled to the first non-blocking cache to service misses in the first non-blocking cache. A data return path coupled to the second non-blocking cache couples data returning from the second non-blocking cache to both the first non-blocking cache and the device generating the access to the first non-blocking cache.

In another aspect, the present invention involves a processor that executes coded instructions including an instruction scheduling unit receiving the coded instructions and issuing the received instruction for execution. An instruction execution unit generates data accesses in response to the issued instructions. A first non-blocking cache receives a data access from the instruction execution unit in the processor. A second non-blocking cache is coupled to the first non-blocking cache to service misses in the first non-blocking cache. A data return path coupled to the second non-blocking cache is used to couple data returning from the second non-blocking cache to both the first non-blocking cache and the device generating the access to the first non-blocking cache.

The foregoing and other features, utilities and advantages of the invention will be apparent from the following more particular description of a preferred embodiment of the invention as illustrated in the accompanying drawings.

DETAILED DESCRIPTION OF THE PREFERRED EMBODIMENTS

The present invention involves a method an apparatus in a non-blocking hierarchical cache for preventing thrashing, or in another sense, tolerating thrash conditions such that the processor can satisfy memory requests even when thrashing conditions exist. The present invention is illustrated in a three-level cache system, however, it is contemplated that any number of cache levels may be implemented and make use of the present invention.

Figure 1:
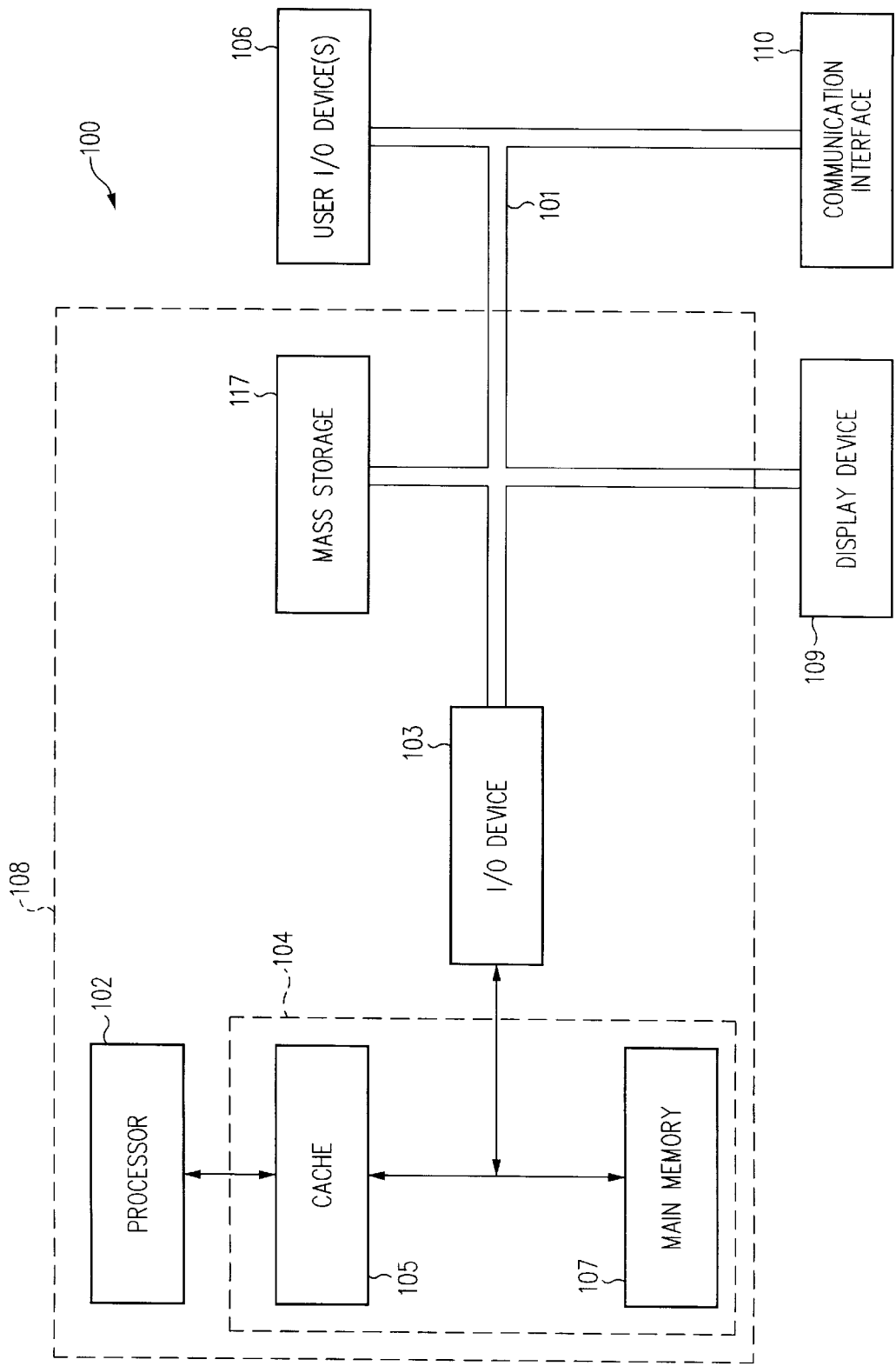
FIG. 1 shows in block diagram form a computer system incorporating an apparatus and system in accordance with the present invention.

Processor architectures can be represented as a collection of interacting functional units as shown in FIG. 1. These functional units, discussed in greater detail below, perform the functions of fetching instructions and data from memory, preprocessing fetched instructions, scheduling instructions to be executed, executing the instructions, managing memory transactions, and interfacing with external circuitry and devices.

Figure 2:
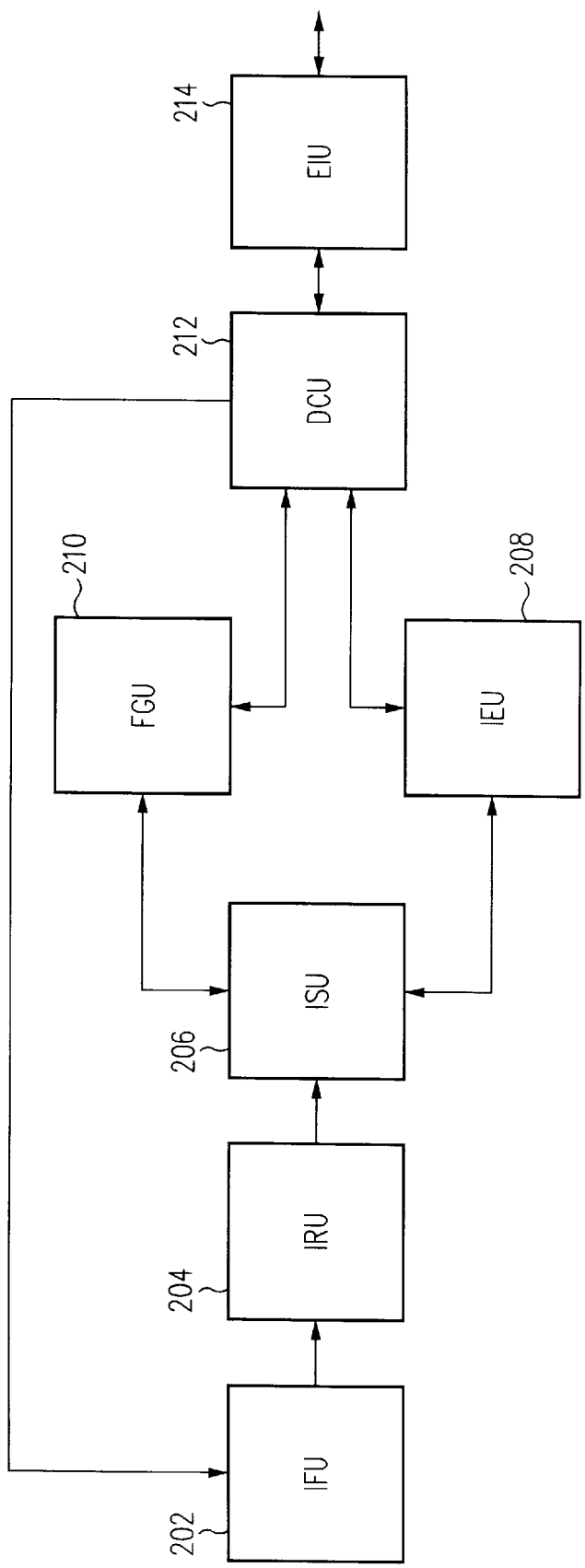
FIG. 2 shows a processor in block diagram form incorporating the apparatus and method in accordance with the present invention.

The present invention is described in terms of apparatus and methods particularly useful in a superpipelined and superscalar processor 102 shown in block diagram form in FIG. 1 and FIG. 2. The particular examples represent implementations useful in high clock frequency operation and processors that issue and executing multiple instructions per cycle (IPC). However, it is expressly understood that the inventive features of the present invention may be usefully embodied in a number of alternative processor architectures that will benefit from the performance features of the present invention. Accordingly, these alternative embodiments are equivalent to the particular embodiments shown and described herein.

FIG. 1 shows a typical general purpose computer system 100 incorporating a processor 102 in accordance with the present invention. Computer system 100 in accordance with the present invention comprises an address/data bus 101 for communicating information, processor 102 coupled with bus 101 through input/output (I/O) device 103 for processing data and executing instructions, and memory system 104 coupled with bus 101 for storing information and instructions for processor 102. Memory system 104 comprises, for example, cache memory 105 and main memory 107. Cache memory 105 includes one or more levels of cache memory. In a typical embodiment, processor 102, I/O device 103, and some or all of cache memory 105 may be integrated in a single integrated circuit, although the specific components and integration density are a matter of design choice selected to meet the needs of a particular application.

User I/O devices 106 are coupled to bus 101 and are operative to communicate information in appropriately structured form to and from the other parts of computer 100. User I/O devices may include a keyboard, mouse, card reader, magnetic or paper tape, magnetic disk, optical disk, or other available input devices, include another computer. Mass storage device 117 is coupled to bus 101 may be implemented using one or more magnetic hard disks, magnetic tapes, CDROMs, large banks of random access memory, or the like. A wide variety of random access and read only memory technologies are available and are equivalent for purposes of the present invention. Mass storage 117 may include computer programs and data stored therein. Some or all of mass storage 117 may be configured to be incorporated as a part of memory system 104.

In a typical computer system 100, processor 102, I/O device 103, memory system 104, and mass storage device 117, are coupled to bus 101 formed on a printed circuit board and integrated into a single housing as suggested by the dashed-line box 108. However, the particular components chosen to be integrated into a single housing is based upon market and design choices. Accordingly, it is expressly understood that fewer or more devices may be incorporated within the housing suggested by dashed line 108.

Display device 109 is used to display messages, data, a graphical or command line user interface, or other communications with the user. Display device 109 may be implemented, for example, by a cathode ray tube (CRT) monitor, liquid crystal display (LCD) or any available equivalent.

FIG. 2 illustrates principle components of processor 102 in greater detail in block diagram form. It is contemplated that processor 102 may be implemented with more or fewer functional components and still benefit from the apparatus and methods of the present invention unless expressly specified herein. Also, functional units are identified using a precise nomenclature for ease of description and understanding, but other nomenclature often is often used to identify equivalent functional units.

Instruction fetch unit (IFU) 202 comprises instruction fetch mechanisms and includes, among other things, an instruction cache for storing instructions, branch prediction logic, and address logic for addressing selected instructions in the instruction cache. The instruction cache is commonly referred to as a portion (I$) of the level one (L1) cache with another portion (D$) of the L1 cache dedicated to data storage. IFU 202 fetches one or more instructions at a time by appropriately addressing the instruction cache. The instruction cache feeds addressed instructions to instruction rename unit (IRU) 204. Preferably, IFU 202 fetches multiple instructions each cycle and in a specific example fetches eight instructions each cycle.

In the absence of conditional branch instruction, IFU 202 addresses the instruction cache sequentially. The branch prediction logic in IFU 202 handles branch instructions, including unconditional branches. An outcome tree of each branch instruction is formed using any of a variety of available branch prediction algorithms and mechanisms. More than one branch can be predicted simultaneously by supplying sufficient branch prediction resources. After the branches are predicted, the address of the predicted branch is applied to the instruction cache rather than the next sequential address.

IRU 204 comprises one or more pipeline stages that include instruction renaming and dependency checking mechanisms. The instruction renaming mechanism is operative to map register specifiers in the instructions to physical register locations and to perform register renaming to prevent dependencies. IRU 204 further comprises dependency checking mechanisms that analyze the instructions to determine if the operands (identified by the instructions' register specifiers) cannot be determined until another "live instruction" has completed. The term "live instruction" as used herein refers to any instruction that has been issued to an execution pipeline but has not yet completed or been retired. IRU 204 is described in greater detail with reference to FIG. 3. IRU 204 outputs renamed instructions to instruction scheduling unit (ISU) 206.

Program code may contain complex instructions, also called "macroinstructions", from the running object code. It is desirable in many applications to break these complex instructions into a plurality of simple instructions or "microinstructions" to simplify and expedite execution. In a specific implementation, the execution units are optimized to precisely handle instructions with a limited number of dependencies using a limited number of resources (i.e., registers). Complex instructions include any instructions that require more than the limited number of resources or involve more than the limited number of dependencies. IRU 204 includes mechanisms to translate or explode complex instructions into a plurality of microinstructions. These microinstructions are executed more efficiently in the execution units (e.g., floating point and graphics execution unit (FGU) 210 and integer execution unit (IEU) 208) than could the macroinstructions.

ISU 206 receives renamed instructions from IRU 204 and registers them for execution. Upon registration, instructions are deemed "live instructions" in a specific example. ISU 206 is operative to schedule and dispatch instructions as soon as their dependencies have been satisfied into an appropriate execution unit (e.g., integer execution unit (IEU) 208, or floating point and graphics unit (FGU) 210). ISU 206 also maintains trap status of live instructions. ISU 206 may perform other functions such as maintaining the correct architectural state of processor 102, including state maintenance when out-of-order instruction processing is used. ISU 206 may include mechanisms to redirect execution appropriately when traps or interrupts occur and to ensure efficient execution of multiple threads where multiple threaded operation is used. Multiple thread operation means that processor 102 is running multiple substantially independent processes simultaneously. Multiple thread operation is consistent with but not required by the present invention.

ISU 206 also operates to retire executed instructions when completed by IEU 208 and FGU 210. ISU 206 performs the appropriate updates to architectural register files and condition code registers upon complete execution of an instruction. ISU 206 is responsive to exception conditions and discards or flushes operations being performed on instructions subsequent to an instruction generating an exception in the program order. ISU 206 quickly removes instructions from a mispredicted branch and initiates IFU 202 to fetch from the correct branch. An instruction is retired when it has finished execution and all older instructions have retired. Upon retirement the instruction's result is written into the appropriate register file and is no longer deemed a "live instruction".

IEU 208 includes one or more pipelines, each pipeline comprising one or more stages that implement integer instructions. IEU 208 also includes mechanisms for holding the results and state of speculatively executed integer instructions. IEU 208 functions to perform final decoding of integer instructions before they are executed on the execution units and to determine operand bypassing amongst instructions in an out-of-order processor. IEU 208 executes all integer instructions including determining correct virtual addresses for load/store instructions. IEU 208 also maintains correct architectural register state for a plurality of integer registers in processor 102. IEU 208 preferably includes mechanisms to access single and/or double precision architectural registers as well as single and/or double precision rename registers.

FGU 210 includes one or more pipelines, each comprising one or more stages that implement floating point instructions. FGU 210 also includes mechanisms for holding the results and state of speculatively executed floating point and graphic instructions. FGU 210 functions to perform final decoding of floating point instructions before they are executed on the execution units and to determine operand bypassing amongst instructions in an out-of-order processor. In the specific example, FGU 210 includes one or more pipelines dedicated to implement special purpose multimedia and graphic instructions that are extensions to standard architectural instructions for a processor. FGU 210 may be equivalently substituted with a floating point unit (FPU) in designs in which special purpose graphic and multimedia instructions are not used. FGU 210 preferably includes mechanisms to access single and/or double precision architectural registers as well as single and/or double precision rename registers.

A data cache memory unit (DCU) 212, including cache memory 105 shown in FIG. 1, functions to cache memory reads from off-chip memory through external interface unit (EIU) 214. Optionally, DCU 212 also caches memory write transactions. DCU 212 comprises two hierarchical levels of cache memory on-chip and a third cache level accessible through EIU 214. DCU 212 also includes the associated logic to control the cache memory levels. One or more of the cache levels within DCU 212 may be read only memory to eliminate the logic associated with cache writes.

DCU 212 in accordance with the present invention is illustrated in greater detail in FIG. 3 through FIG. 7. DCU 212, alternatively referred to as the data cache subsystem, comprises separate instruction and data caches (labeled I$ and D$ in FIG. 3 and FIG. 4) at the primary level, a unified on-chip level 2 cache and an external level 3 cache. When processor 102 recognizes that data being read from memory is cacheable, processor 102 reads an entire 32-byte line into the appropriate cache (i.e., L1, L2, L3, or all three). This operation is called a cache line fill. If the memory location containing that operand is still cached the next time processor 102 attempts the operand, processor 102 can read the operand from the cache instead of going back to memory. This operation is called a "cache hit".

When processor 102 attempts to read data from memory 107 into an architectural register, it first checks if a valid cache line for that memory location exists in the cache. Each cache line is associated with a status bit (V in FIG. 7) that indicates whether the line is valid (i.e., filled with known correct and up-to-date data). If a valid cache line exists, processor 102 reads the data from the cache instead of reading it from main memory 107. This operation is called a "read hit". If a read misses the cache (i.e., a valid cache line is not present for the area of memory being read from), cache memory system 105 continues to determine if the read will hit in a higher cache level. In the case that the missing cache does not have a line allocated for the requested memory location, one is allocated.

As the data is returned from higher cache levels or main memory, it is stored in the allocated cache line for future use.

One feature of the present invention is that as the data is returned, it is also passed downward to lower cache levels and/or a lower level device in processor 102 that generated the cache access. For example, IEU 208 or FGU 210 could generate a cache access while executing an instruction. Similarly, the level 1 caches (I$, D$) could generate a cache access to the level 2 cache. In accordance with the present invention, the returning data is written through the cache level rather than waiting for that cache level to fill the line and validate the data.

This almost immediate data availability to the lower level devices must be coordinated so that the lower level device can receive the returning data. One aspect of the present invention uses signaling from upper cache levels to lower cache levels and other lower level devices to take control of the lower level devices at a highest uninterruptible priority and force the lower level device into a state where it will accept the data. These features of the present invention are described in greater detail hereinafter.

When processor 102 attempts to write data to a cacheable area of memory, it first checks if a cache line for that memory location exists in the cache. If a valid cache line does exist, processor 102 (depending on the write policy currently in force) can write the data into the cache instead of (or in addition to) writing it out to main memory 107. This operation is called a "write hit". If a write misses the cache (i.e., a valid cache line is not present for the area of memory being written to), processor 102 performs a cache line fill by allocating a line for the requested data. Cache system 105 then writes the data from internal registers into the allocated cache line and (depending on the write policy currently in force) can also write the data to main memory 107. When the data is to be written out to the L3 cache it is first written to the write back cache unit L2$ WBC, and then written from the L2$ WBC unit to the L3 cache. When the data is to be written out to memory, it is written first into the write back cache unit E$ WBC, and then written from the E$ WBC unit to memory when the system bus is available.

Figure 3:
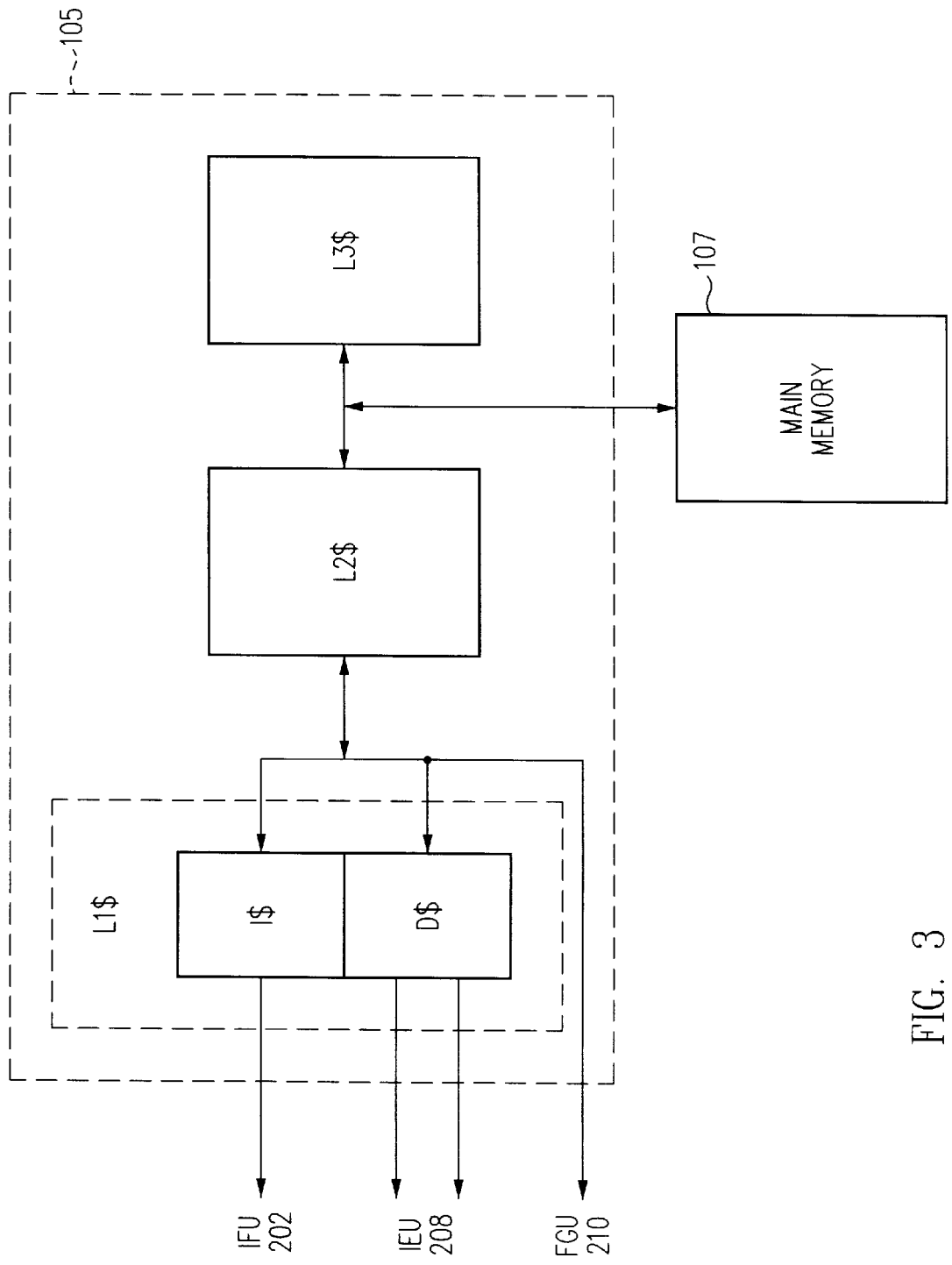
FIG. 3 illustrates in block diagram form a high level overview of a cache subsystem in accordance with the present invention.
Figure 4:
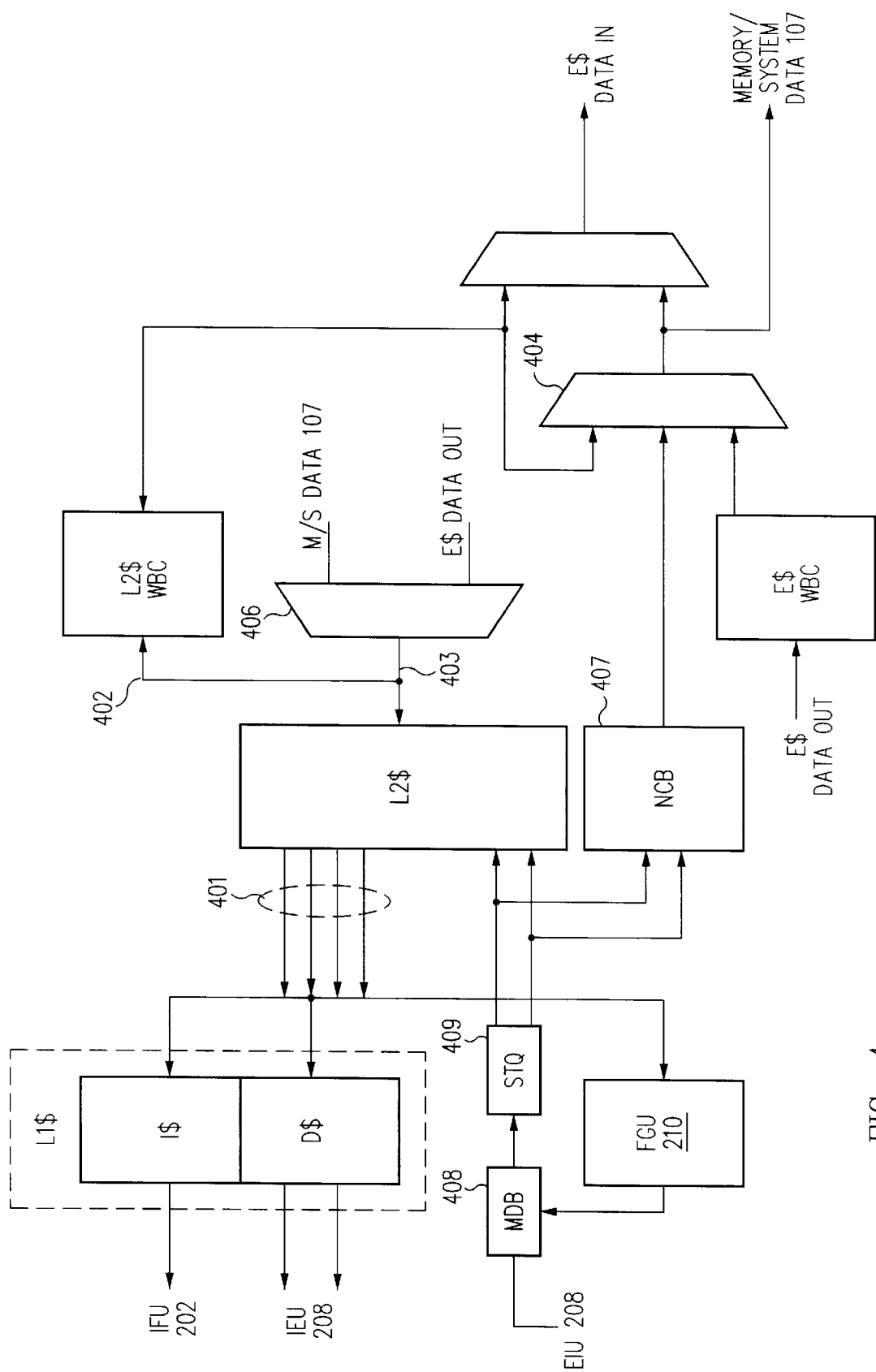
FIG. 4 shows data paths in the cache subsystem of FIG. 3 in block diagram form.

FIG. 3 and FIG. 4 show an example cache subsystem 105 in accordance with the present invention including the major data paths between these functional units. The first level cache (L1$ in FIG. 3) has the lowest latency at approximately two clock cycles. The level 2 cache (labeled L2$) is next at 11 clock cycles which, again, is measured from the launch of the virtual address of the load instruction. The L3, off chip cache has an approximate latency of 25 cycles and finally latency to main memory is approximate number at 100. The detailed sections on each of these cache levels will contain descriptions about the specific delay contributors.

The instruction cache denoted as I$ in FIG. 3 and FIG. 4 is controlled by IFU 202 and provides one or more instructions per cycle to IFU 202. In a particular example, I$ is non-blocking and is virtually addressed by the instruction pointer generator as described in referenced to IFU 202.

The level one data caches denoted as D$ services one or more loads or stores per cycle to IEU 208. In the particular implementation shown in FIG. 3, two operations per cycle are implemented by replicating D$ into two separate 64 KBytes caches that are kept identical. Other means of providing multiple accesses per cycle are known, and may be preferable in certain applications. However, duplicating D$ is straightforward, is compatible with fast operation, and an acceptable increase in hardware size because D$ is relatively small compared to higher cache levels. D$ is also implemented as a non-blocking cache and is indexed virtually from two independent memory pipes. In the example of FIG. 3 and FIG. 4, both copies of D$ are read only data caches to improve performance. It should be understood that read-write data caches may be substituted and make use of the teachings in accordance with the present invention with predictable impact on performance and complexity.

The level 2 cache is a unified instruction and data cache in the example of FIG. 3 and FIG. 4. L2$ comprises four independent 8 byte read ports 401, a 16-byte write port 402, and a 32 byte fill and victim port 403 in a specific implementation. Preferably, L2$ is a fully pipelined, and non-blocking cache that comprises a mechanism (memory scheduling window 502 shown in FIG. 5) to track all outstanding memory references. Floating point data requests from FGU 210 are accessed directly from the L2 cache. Multiplexor 404 under control of cache unit 105 selectively couples either the output of WBC, the output of the L2 write back cache, or the output of non cacheable store buffer 407 to main memory 107. Multiplexor 406 under control of cache unit 105 selectively couples the E$ output or data from the memory bus to place on fill/victim port 403.

The level 3 cache is off-chip in the particular embodiment of FIG. 3 and FIG. 4. Most architectures must implement at least some cache off-chip. Latency of the off-chip cache may be 20–50 times that of on-chip cache. The L3 cache may be implemented using, for example, SRAM or dual data RAM (DDR). DDR is a synchronous component that provides a clock along with returned data that enables a data rate of 16 Gbyte/second or higher.

In a particular example, processor 102 generates a 45 bit physical address capable of physically addressing 32 TeraByte of memory. Main memory 107 can be implemented in any available RAM component such as DRAM, EDODRAM, SDRAM, or SDRAM2 which like the DDR SRAM discussed above provides a clock along with data allowing it to provide high bandwidth performance.

FIG. 4 shows a block diagram that highlights data paths throughout cache and memory subsystem 105 in accordance with the present invention. A data path from the level 2 cache to I$ is 256 bits (32 Bytes) wide in a particular example. The specific byte widths of access ports and data paths are provided to illustrate relative scale between components and are not a limitation on the teachings of the present invention. It is well known to adjust the data path widths to achieve particular operational performance. Both copies of the level 1 data caches D$ are filled from the level 2 cache with identical data from the same 32 Byte port. Because they are read only, independently reading the caches does not raise any coherency issues. If the multiple D$ caches were write enabled, additional measures would be required to ensure cache coherency between the D$ copies.

A memory disambiguation buffer (MDB) 408 feeds a store queue (STQ) 409. ISU 206, shown in FIG. 2, generates loads following unretired stores that may potentially access the same address. Detection of a "read after write" (RAW) hazard occurs in MDB 408 and this event generates a bypass of the store data to the pipes. MDB 408 also feeds STQ 409 where store coalescing will occur and the eventual write to the level 2 cache. Store coalescing reduces memory traffic by combining two or more memory operations into a single operation where the operations affect the same blocks of data and that data is stored in STQ 409.

The level 2 cache is unified and has four ports in the implementation shown in FIG. 3 and FIG. 4. Access to the level 2 cache is controlled by a memory scheduling window 502 shown in FIG. 5 which is a tracking mechanism for all accesses that caused a miss in the L1 I and D caches, FGU 210, the prefetching hardware in IFU 202, or the operating system during snoops. The external level 3 cache, labeled E$ in the figures, is accessed via an on-chip tag store in accordance with the present invention. In a particular example, E$ is 4-way set associative with a 256 bit data bus. The data bus connection to main memory 107 (and the system) is 128 bits wide.

Figure 5:
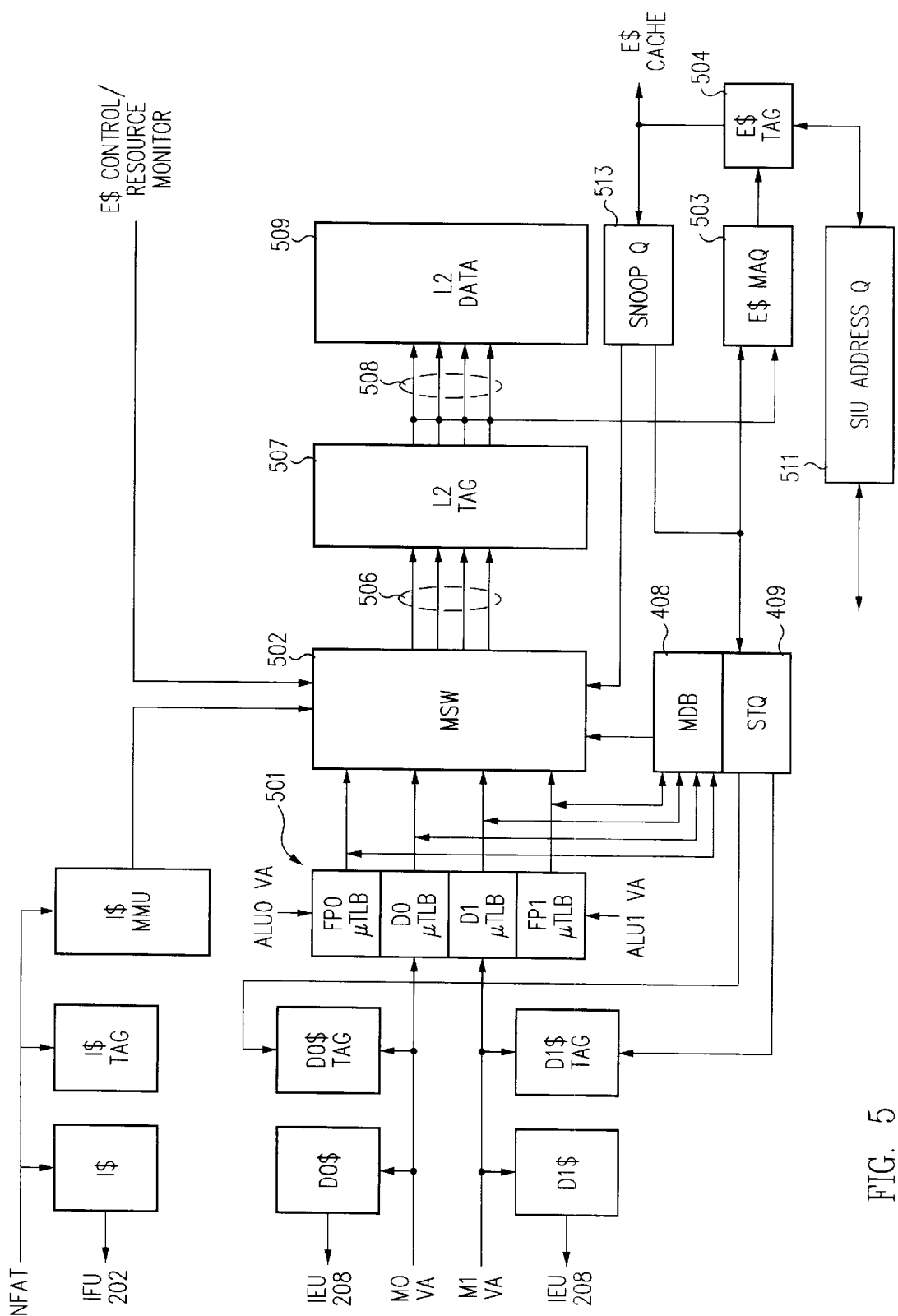
FIG. 5 illustrates address paths in the cache subsystem of FIG. 3 in block diagram form.

FIG. 5 illustrates address paths for cache/memory subsystem 105. The first level caches (I$ and all copies of D$) are virtually indexed and physically tagged. These caches have each line indexed by virtual address, however the tag bits are from the physical address determined after the virtual address is translated. In a particular implementation, I$ is a 64 KByte four-way set associative cache that is addressed by a next fetch address table (NFAT) within IFU 202. Desirably, I$ is fully wave pipelined delivering 8 instructions per cycle. A miss in I$ is satisfied from either the Level 2 cache or an instruction prefetch streaming buffer (not shown). Other implementations of I$ are possible including direct mapped, 2-way set associative, and fully associative and may be desirable in some applications. Accordingly, these other implementations are equivalent to the specific embodiments described herein for purposes of the present invention.

In a particular example, IEU 208 includes two memory pipes M0 and M1 generating effective virtual addresses (indicated by M0 VA and M1 VA in FIG. 5) for integer and floating point load and store operations. IEU 208 also includes two arithmetic logic units (ALU0 and ALU1) generating virtual addresses (indicated by ALU0 VA and ALU1 VA) dedicated for floating point loads and stores. Virtual to physical address translation occurs in a conventional manner through micro translation lookaside buffers ($\mu$TLBs) 501 that are hardware controlled subsets of a main translation lookaside buffer (TLB) (not shown). TLBs store the most-recently used virtual:physical address pairs to speed up memory access by reducing the time required to translate virtual addresses to physical addresses needed to address memory and cache.

In the implementation shown in FIG. 5, four integer/floating point loads are generated per cycle into the level 2 cache. The entry point into the level 2 cache is via the memory scheduling window (MSW) 502 that tracks all memory operations not satisfied by the level 1 caches. MSW 501 functions to track all outstanding memory requests, retain addresses for fills and snooping and perform bank conflict resolution so that all four ports are afforded access the each of the banks of the level 2 cache. In a specific example, the L2 cache comprises 16 banks of 32 Kbyte memory. All four $\mu$TLBs generate addresses to MDB 408 and STQ 409 described hereinbefore. MDB 408 performs dynamic memory address disambiguation which enables the out-of order execution of memory operations (e.g., LOAD and STORE operations).

MSW 502 includes four address ports 506 each of which can couple a new address to L2 TAG 507 every clock cycle. L2 TAG 507 operates in a conventional manner to index each line in L2 data portion 509 via lines 508. In the example of FIG. 5, L2 TAG 507 and L2 data portion 509 are organized as a four-way set associative cache. The present invention could alternatively be implemented in a direct mapped cache in which each main memory address maps to a unique location in the cache. In fully associative cache, data from any main memory address can be stored in any cache location. All tags must be compared simultaneously (i.e., associatively) with the requested address, and if one matches, then its associated data is accessed. Set associative cache is a compromise between direct mapped cache and a fully associative cache where each address is mapped to a set of cache locations. The four-way set associative cache of the specific example allows each address to map to four different cache locations.

E$ memory address queue (MAQ) 503 maintains a record of level 2 misses that are directed to the external level 3 cache and to main memory 107. It may be desirable to maintain the E$ TAG unit 504 on-chip even where the external cache is off-chip for high bandwidth and low latency. On-chip E$ TAG 504 also supports an off-chip associative cache. On-chip E$ TAG unit 504 enables processor 102 to filter system coherence snoops from EIU 214 to minimize the impact of snoops on processor 102 except when a match to the E$ TAG is detected.

The operating system may support an ability to "snoop" accesses to system memory and to their internal caches via snoop queue 513. This snooping ability is used to keep internal caches consistent both with system memory and with the caches in processor 102. The snoop capability is also relied on to provide cache coherency in multiprocessor applications.

Figure 6:
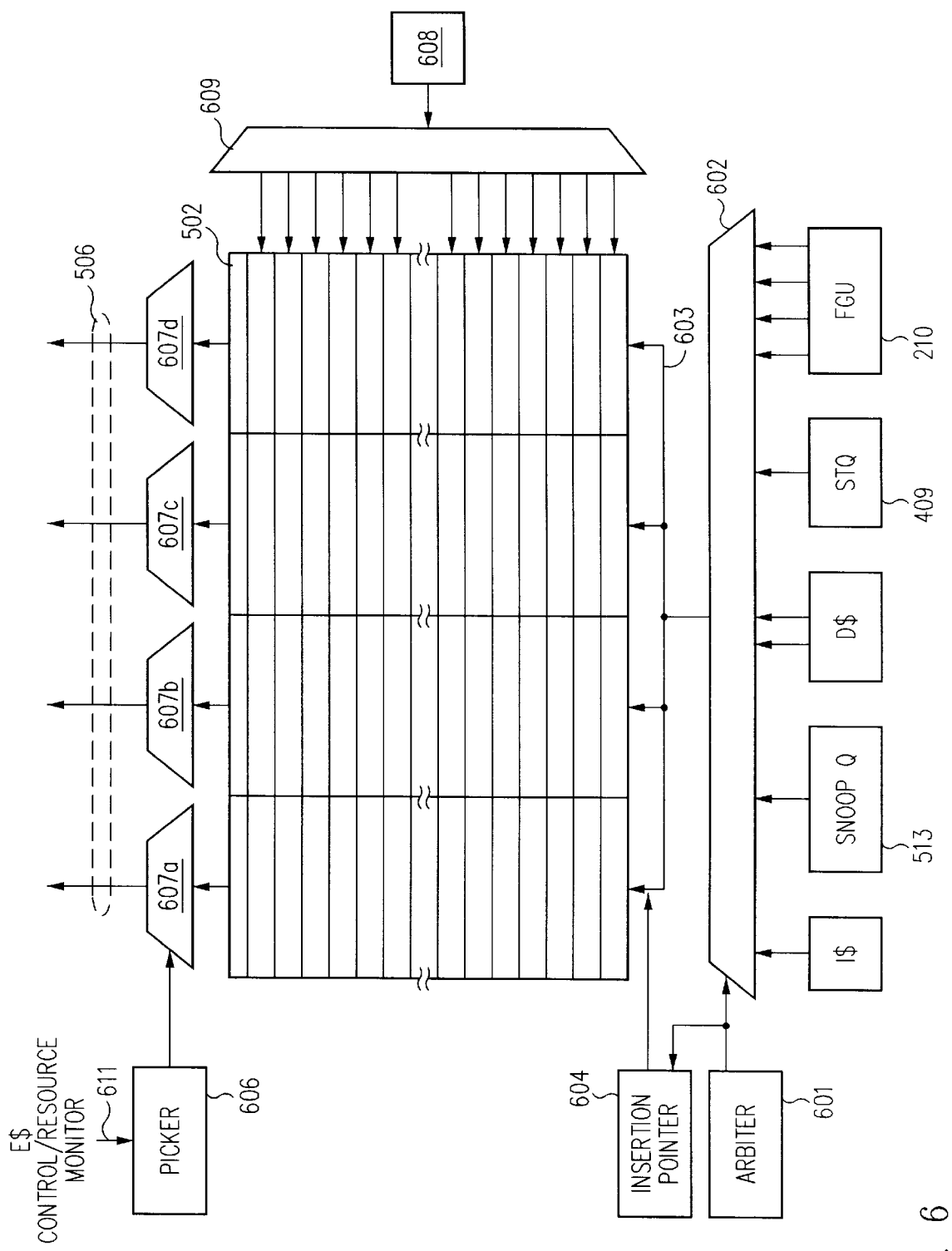
FIG. 6 illustrates operation of a memory scheduling window in accordance with the present invention.

FIG. 6 illustrates in block diagram form major features and connections useful in the operation of memory scheduling window 502. As described hereinbefore, all cache structures are desirably implemented as non-blocking cache. In the event of a miss to any cache, that cache is available for subsequent references. MSW 502 serves as a centralized memory reference management structure and as an entry point into the level 2 cache. MSW 502 may be equivalently implemented between, for example, main memory 107 and the level 3 cache (E$) in addition to the implementation shown in FIG. 6. MSW 502 records, tracks and acts upon all references into the level 2 cache. MSW 502 is not informed of references that are satisfied at the level 1 caches in the exemplary implementations of the present invention, although it is contemplated that such information may be useful in some applications. All other cache/memory accesses will arbitrate and then create an entry into MSW 502.

The level 2 cache receives "bottom-up" access from the level one caches and FGU 210. These are referred to as bottom up because the access request originates from a lower cache level or a functional unit within the processor itself. Other bottom-up accesses are originated from I$, D$, STQ 409, and snoop queue 513. The level 2 cache also receives "top-down" accesses such as data from an L2 miss being pushed down from E$ or main memory 107. One feature of the present invention is that top-down accesses are always given priority over bottom-up accesses, eliminating the need for arbitration between top-down and bottom-up accesses.

Arbiter 601 referees among the requesting bottom-up agents for access to the L2 cache by controlling one or more multiplexors 602. Priorities are a matter of design choice to meet the needs of a particular application. In a specific example, arbiter 601 is given a strong bias to accesses from the L1 data and instruction caches (D$, I$) and a weak bias to the snoop queue 513, however it is contemplated that other priorities and biases will be useful in particular applications. MUX 602 selects the bottom up access as directed by arbiter 601 and couples the selected access to one of insertion ports 603.

MSW 502 is organized as a number of columns of entries. In the example of FIG. 5, MSW 502 includes the same number of columns (four) as the number of address ports 506 in the level 2 cache. In a particular example, each column includes 32 entries. Four entries in any given row are indexed at the same time by the row number (i.e. 0 to 31) allowing MSW 502 to launch up to four access requests to the level 2 cache simultaneously through ports 506. Desirably, the columns in MSW 502 wrap around such that row 0 is logically adjacent to row 31. Each column of entries in MSW 502 is coupled to receive bottom up accesses through one insertion port 603. Insertion port 603 is under control of insertion pointer 604. Any column may be coupled to any port 506 through multiplexors 607a, 607b, 607c, and 607d in response to select signals generated by picker 606.

Figure 7:
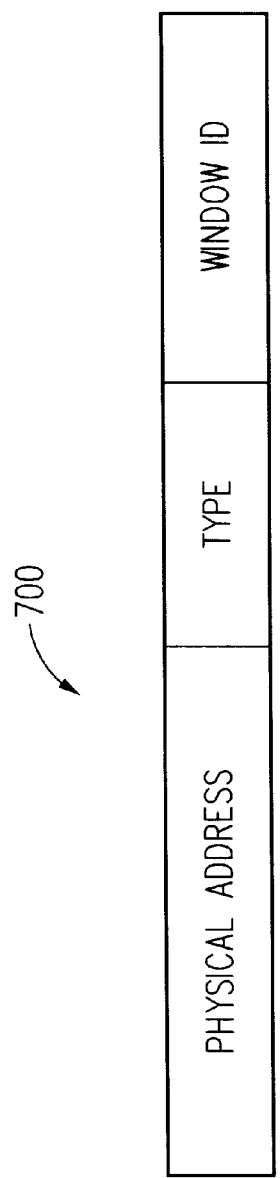
FIG. 7 illustrates an exemplary entry in the memory scheduling window shown in FIG. 6.
Figure 7:
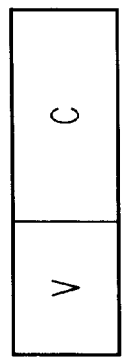

Each entry 700, shown in detail in FIG. 7, is associated with a valid bit (V) indicating whether the current entry is valid. When a memory operation is completed it is marked invalid indicating that the corresponding line in the level 2 cache can service bottom up access requests. Entries become invalid when the level 2 cache access is considered complete. A valid entry ping queue manager 608 is operative to set the valid bit directly in each entry through multiplexor 609. Valid entry ping manager 608 is desirably used because an access request can be terminated at anytime after insert or removal.

One or more conflict (C) bits used for conflict checking are associated with each entry. A conflict exists when two entries include addresses that map to the same bank. These entries conflict and should not be launched at the same time. Similarly, each entry includes a type identifier that indicates the type of access represented (e.g., read, write, floating point, instruction, data). Differing data types may return differing amounts of data on each access, and so not all types allow four accesses to be launch simultaneously. For example, accesses generated to fill I$ and D$ are serviced by 32 byte data loads whereas accesses generated by FGU 210 generated 8 byte data loads in the particular examples given herein. The type identifier allows MSW 502 to prevent launching an I$ and D$ simultaneously (or with a floating point load) as the I$ and D$ will occupy the entire data port in the particular example. It is contemplated that other type identifiers may be used. Moreover, in some applications, for example where all data types generate loads of similar width, type identifiers would not be needed.

A number of physical address (PA) bits identify a physical memory address that is the target of a particular memory operation. It is the PA that is actually applied to the level 2 cache on address ports 506 to access a specific location in the level 2 cache. If the level 2 cache were virtually addressed, the PA fields would be equivalently substituted by virtual address bits.

Each entry may include a window ID held in MSW 502. Window ID's are provided by an instruction scheduling window within instruction scheduling unit 206 (shown in FIG. 2) for every integer load. The window ID as selected by picker 606 alerts or signals ISU 206 that the load pointed to by the window ID field should be replayed so that the index of the load is available at the D0$ D1$ caches when data is supplied by the level 2 cache. Every integer load that misses in the D$ cache is tagged with a window ID and ISU 206 expects a response for all outstanding loads. Since up to two integer loads can be received each clock cycle, picker 606 can send up to two window IDs back to ISU 206.

Insert pointer 604 selects the next available entry in each pane. An entry is considered available when it is empty or when it is a invalid but fully resolved entry. Insert pointer 604 indexes to a next entry beyond where it currently points and examines the V and C bits to decide if it can insert. If yes, then it increments it's pointer and moves forward. Nothing stalls insertion except for the queue wrapping to an entry that is not completed (valid). To simplify operation of insertion pointer 604, it will not jump over any invalid entries in search of valid ones. However, more efficient use may be made of MSW 502 if such jumping is enabled, at the cost of increased complexity.

Once an entry is created and inserted in MSW 502, there are optionally performed a number of camming checks. Examples of such camming checks include a transit check which is a detection of whether there is any older access in flight to the same cache set, a secondary reference check which checks to see if the exact same cache block is currently being fetched from the L3 cache or Main Memory 107 by an earlier access, and a bank conflict check which is a check across the four ports of an entry to detect bank conflicts within the entry. These camming checks can be implemented using known content addressable memory (not shown) (CAM) techniques, circuits, and hardware and would desirably be performed in a single clock cycle. When the camming checks are complete the Valid bit (V) is asserted and picker 606 can pick that entry for L2 access.

Picker 606 selects valid entries from MSW 502 for access to the L2 cache. In normal operation picker 606 "chases" insertion pointer 604. The results of these accesses are not known to picker 606. Unlike conventional cache organizations that maintain a count of accesses that have missed and generated accesses to higher cache levels or main memory, picker 606 in accordance with the present invention does not include any self-throttling mechanisms that act in response to a level 2 cache miss. Hence, in normal operation picker 606 operates as if every access results in a hit in the level 2 cache.

In fact, some access will hit in the level 2 cache and some will miss which are then sent on to the level 3 cache. These misses can also cause writebacks from the level 2 cache to the level 3 cache (which is also not known to picker 606). In accordance with the present invention, as references to the L3 are resolved, E$ includes a control/resource monitor unit that enables the L3 cache (E$) to take control of picker 606 via control line 611 and point picker 606 at a particular entry or set of entries associated with a miss. Preferably, this control is complete and unarbitrable.

When the level 3 operation is complete it releases control of picker 606 and allows the picker to resume normal operation. By allowing the level 3 cache to take absolute control of the picker in a manner that disables its ability to generate any further requests, the level 3 cache can also monitor and control its own resources. The level 3 cache is aware of its own resource limitations such as the number of outstanding references to E$, remaining capacity in E$ MAQ 503, remaining capacity in snoop Q513, and the like. When one or more resources are expended or used to a predetermined "high water mark", the level 3 cache uses that awareness in accordance with the present invention to prevent further access until the sufficient resources become available. The level 3 cache prevents further access by causing picker 606 to stall.

In accordance with the present invention, when an access request misses in the level 2 cache the MSW identification (i.e. row number in MSW 502) of the request that missed is appended to the request as it is forwarded to the level 3 cache. As outstanding references in L3$ or E$ complete, L3$ or E$ uses the appended index to point picker 606 to selected entries 700 in MSW 502 that either perform the fill or writeback, eventually clearing the stall condition in the level 3 cache. Finally, the level 3 controller releases the picker and normal operation resumes.

All requests selected by picker 606 for access to the L2 cache are tagged for tracking throughout the cache and memory hierarchy with an MSW ID. The MSW ID is a reference that causes picker 606 to point to a particular entry. When a miss occurs on any level 2 access, the MSW ID is appended to the request at the level 3 cache. When data is returned for this request, the corresponding MSW ID for the entry being filled is forced on to picker 606 by the E$ control/resource monitor and overrides the current pointer position of picker 606. In turn, MSW 502 provides the appropriate index to the L2 cache for storing the data returned from E$ or main memory 107. This mechanism is also used for victim processing.

As set out hereinbefore, as data is returned, it is substantially simultaneously passed downward (i.e., in parallel) to lower cache levels and/or a lower level device in processor 102 that generated the cache access. The term "substantially simultaneously" means that the return data is transferred downward without waiting for the data to be stored and marked valid in the cache (i.e., before the cache fill operation is complete).

In the case of accesses generated by misses in the level 1 data caches D0$ and D1$, the window ID within an entry is accessed when picker 606 is forced to point at that entry. The window ID alerts downstream logic, specifically ISU 206, to "replay" the instruction generating the corresponding cache access. This replay results in a reissue of the access request that missed. Preferably, this reissue is synchronized with the returned data such that the returned data arrives at D0$ or D1$ substantially simultaneously with the reissued access. Because the instruction replay mechanism aligns the arrival of the index of the load address at the first level cache, the operation has the appearance of a read (i.e., a read or load instruction is executed) but in effect performs as a write operation. In this sense, the write operation is enabled by the replay signal generated in response to the window ID and data is written into storage locations (e.g., architectural registers) within the functional unit generating the cache assess request.

While the invention has been particularly shown and described with reference to a preferred embodiment thereof, it will be understood by those skills in the art that various other changes in the form and details may be made without departing from the spirit and scope of the invention. The various embodiments have been described using hardware examples, but the present invention can be readily implemented in software. Accordingly, these and other variations are equivalent to the specific implementations and embodiments described herein.

What is claimed is:

1. In a processor that executes coded instructions, a method for operation of a multilevel hierarchical cache memory unit where each cache level is non-blocking, the method comprising the steps of:

generating a plurality of cache access requests from a lower level device, the access requests including an address identifying a memory location having data that is a target of the access;

applying the address of each request to a lower cache level in a non-blocking fashion;

generating a miss when the lower cache level fails to include valid data corresponding to one of the applied addresses;

servicing the lower cache level miss by requesting data from a higher cache level while continuing to generate access requests; and returning data from the higher cache level in parallel substantially simultaneously to both the lower cache level and the lower level device generating the cache access such that the returning data is synchronized with a reissue of the access request that generated a miss, wherein the reissued access request is generated subsequent to the cache access request that generated the miss.

2. The method of claim 1 wherein the returning data is coupled to the lower level device with a highest available priority.

3. The method of claim 1 wherein the step of servicing further comprising the steps of tagging the access with indicia of an instruction generating the access that generated the miss; and associating the returning data with the instruction generating the access in the lower level device using the indicia.

4. The method of claim 1 further comprising the steps of:

signaling the lower level device upon receipt by the lower level cache of the returning data; and regenerating the cache access in the lower level device in response to the signaling step.

5. The method of claim 4 wherein the regenerating step further comprises reissuing the access such that the returning data arrives at the lower cache level substantially simultaneously with arrival of the reissued access.

6. The method of claim 1 further comprising the steps of:

inserting the access into an entry in a memory scheduling window having a plurality of entries, each entry identifiable by an index;

marking an entry as valid when that entry is ready to be applied to the lower cache level;

in response to generating a miss in the lower cache level, appending the index to the access before servicing the access in the higher level cache; and in returning the data, returning the index with the data.

7. A computer system comprising:

a memory;

a processor coupled to the memory, the processor further comprising:

an instruction scheduling unit receiving the coded instructions and issuing the received instruction for execution;

an instruction execution unit generating data accesses in response to the issued instructions;

a first non-blocking cache receiving a data access from the instruction execution unit in a non-blocking fashion such that in the event of a miss the first non-blocking cache remains available for subsequent access requests;

a second non-blocking cache coupled to the first non-blocking cache to service misses in the first non-blocking cache; and a data return path coupled to the second non-blocking cache coupling data returning from the second non-blocking cache in parallel and substantially simultaneously to both the first non-blocking cache and the instruction execution unit such that the returning data is synchronized with a reissue data access request generated subsequent to the data access request that generated the miss.

8. The computer system of claim 7 further comprising:

a pointing unit for accessing selected locations within the first non-blocking cache;

a data port coupled to the device generating the access for providing the data stored at the locations selected by the pointing unit; and a prioritizing device within the device generating the access, the prioritizing device giving data provided on the data port highest uninterruptible priority.

9. The computer system of claim 7 further comprising:

a signaling device coupled to the device generating the access, the signaling device generating a replay signal indicating receipt of the returning data by the device generating the access; and a load replay unit within the instruction scheduling unit that generates a reissue of the access to the first non-blocking cache in response to the replay signal.

10. The computer system of claim 7 further comprising:

addressable data storage locations within the instruction execution unit and a write enable input operative to store data at the addressable data storage locations;

a write enable signal generator coupled to the instruction execution unit, the write enable signal generator generating a write enable signal upon receipt of the returning data; and a load replay unit addressing data storage locations within the instruction execution unit thereby enabling the first non-blocking cache to write the returning data to the addressed storage locations.

11. A method for operation of a non-blocking cache memory comprising:

generating a cache access from a lower level device by applying an address to a cache memory, wherein the applied address identifies a cache line within the cache memory that is a target of the cache access;

generating a miss when the identified cache line fails to include valid data corresponding to the applied address;

servicing the miss by requesting data from another memory device, wherein the servicing results in returning data to the cache; and causing the lower level device to reapply the address of the cache access to the cache memory substantially simultaneously with the arrival of the returning data to the cache memory.

12. The method of claim 11 further comprising:

writing the returning data to the cache at the location identified by the applied address.

* * * * *